2,932,823
SELECTIVE DIRECTIONAL SLOTTED WAVE GUIDE ANTENNA

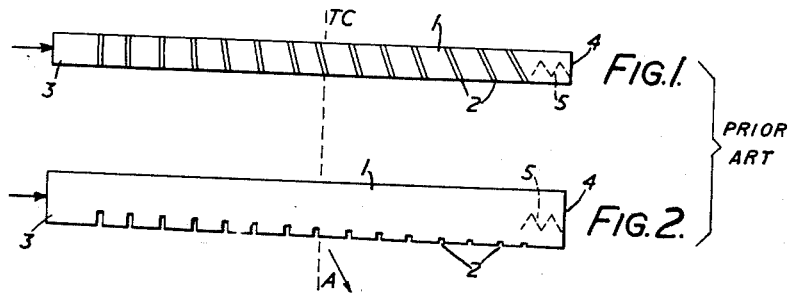
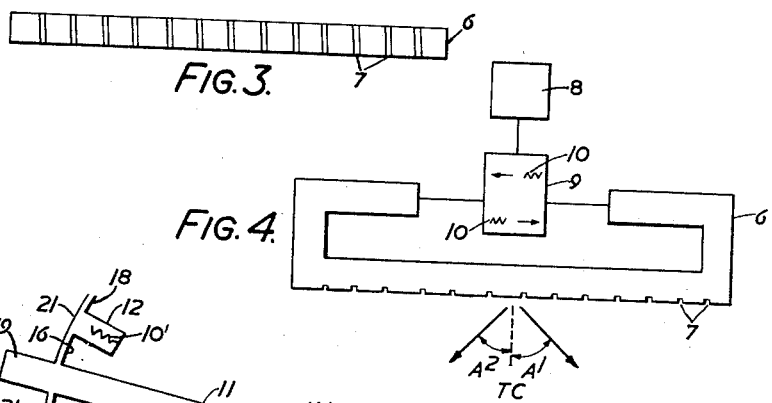
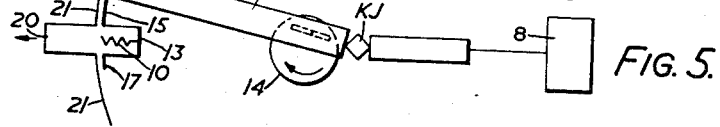
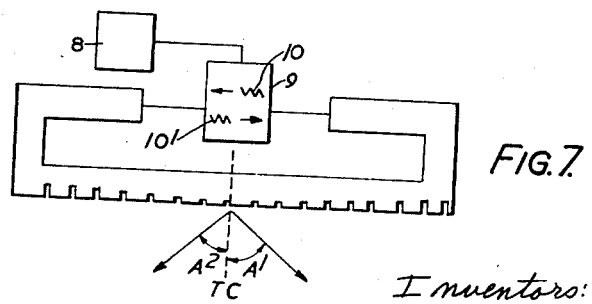

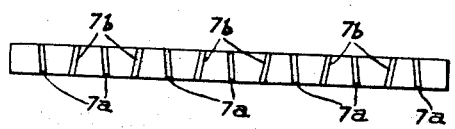
FIG. 8.
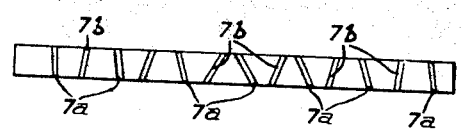
FIG. 9.
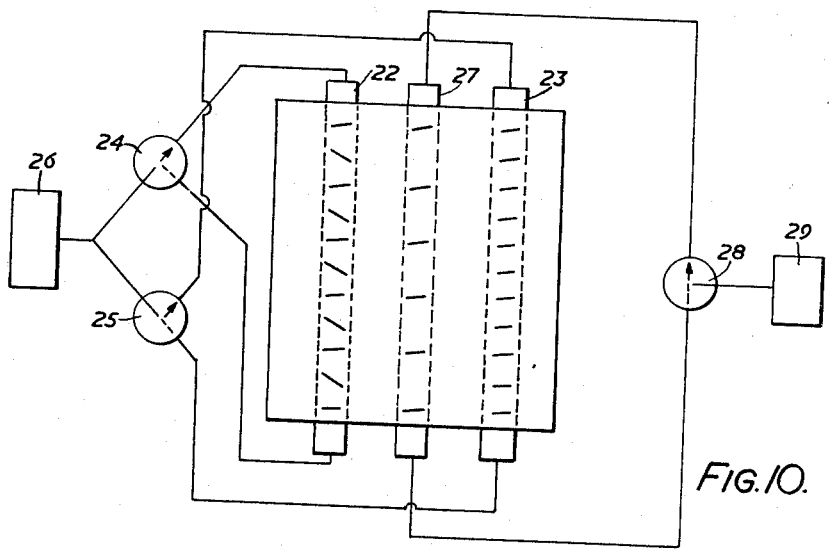
FIG. 10.
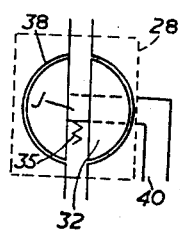
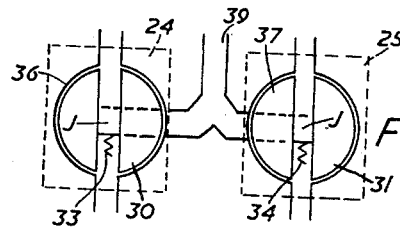
FIG. 11.

Geoffrey Edward Beck, Billericay, and Frank Anderson Onians, Great Baddow, England, assignors to Marconi's Wireless Telegraph Company Limited, London, England, a company of Great Britain Application August 19, 1957, Serial No. 678,881

Claims priority, application Great Britain September 26, 1956

6 Claims. (Cl. 343—771)

This invention relates to aerial systems and has for its object to provide improved aerial systems suitable for use in radio speed and drift indicating installations for aircraft, though, as will be apparent later, aerial systems in accordance with this invention are applicable for other purposes also.

There are known aircraft radio speed and drift indicating arrangements in which speed or drift is ascertained by transmitting radio energy downwards and simultaneously forward to port and aft to starboard or forward to starboard and aft to port and receiving earth reflected energy back again, aircraft speed or drift being obtained by phase or time comparing the reflecting energies from which speed or drift can be deduced since the Doppler frequency changes in the reflected energies will depend upon the aircraft speed or drift. Such installations are often referred to as multiple transmission Doppler speed indicating arrangements and can obviously be used to measure speed in the forward direction, i.e. speed proper, or speed sideways, i.e. drift or both.

Where the wavelength in free space is short, i.e. of the order of a meter or less, it is, as is known, practicable and advantageous to obtain the directive radiation required by using "slotted" waveguides as the radiating elements, i.e. by using waveguides in which have been cut resonant slots having certain predetermined geometrical relationships with the guide. Such slotted waveguide aerials as at present known have slots so arranged that the angles at which successive slots lie with respect to the transverse cross-sectional plane of the guide are progressively increased from end to end of the guide the slots nearest one end lying at a greater angle (in a typical case 14°) to the said plane than the slot nearest the other end (where, in a typical case, the angle might be 3°). This different angular relationship of the different slots involves the necessity that the aerial must be fed from one end only (that where the slot is at the smallest angle), being of course, terminated at the other by a non-reflecting load resistance. The end to which the feed and load resistance are respectively connected cannot be substituted for one another. Accordingly in typical known aircraft speed and drift indicating arrangements it has been the practice either to use at least one directive waveguide in a fixed reflecting hood for each direction in which it is desired to radiate energy or to place each directive waveguide in a moveable reflecting hood to obtain two (selectable) radiation directions from one guide. This involves the necessity for the provision for transmission of either at least four directive slotted waveguides each in a fixed and separate reflecting hood, or two directive waveguides each in a moveable reflecting hood. In either case the installation becomes large and expensive. The chief reason for this complexity, cost and size lies in the fact that, with slotted waveguide aerials as at present in general use each waveguide by itself is capable of radiation in one direction only. Although, as above stated one such waveguide can be made effectively to radiate in two selectable directions by the provision of a moveable reflecting hood, the mechanical complication entailed by the moveable hood is an obvious serious defect.

A further disadvantage of the previously employed directive slotted waveguide radiators above described is that they call for an undesirably high degree of precision in the cutting of the slots in order that they shall lie in the correct relationships one with another and with the guide itself.

The principal object of the present invention is to avoid the foregoing defects and to provide improved and simplified slotted waveguide aerial systems which shall be comparatively simple to manufacture, which can readily be arranged to give either of two pre-determined directions of radiation without involving the provision of mechanically moving hoods and which when applied to radio speed and drift indicating aircraft installations, will enable the number of aerials required for a given result to be reduced as compared to known practice.

According to this invention a slotted waveguide aerial system comprises a length of waveguide having at least one set of slots the slots of which are so arranged that the change of angle of the slots (with reference to the transverse cross sectional plane of the guide) from slot to successive slot in that set is in the same direction from either end of the guide to a central slot and the amount of said change from slot to successive slot is symmetrical about the said center slot; means for selectively connecting either end of said length of guide to a feeder; and means for selectively terminating said length of guide with a non-reflecting load resistance at whichever end is the unfed end. With this arrangement either of two directions of transmission or reception is obtainable merely by changing over the input end with the resistance terminated end. The invention includes the limiting case in which the change of angle from slot to successive slot of a set is zero, i.e. the slots may be all parallel to one another though, in all cases, they will be at an angle other than zero to the transverse cross sectional plane. In the preferred embodiments, however, the change of angle from slot to successive slot of a set is real and symmetrical about the center slot of that set and in the same direction from either end to the center. Thus, if the angle of the center slot is 14°, the angles of the slots between it and one end might decrease (going towards that end) from slot to slot to a minimum of 3° at that end while the angles of the slots between the center and the other end would similarly decrease (going towards that end) from slot to slot to a minimum of 3°.

In the simplest embodiments of the invention there is only one set of slots in the guide length, i.e. the slots are all in phase. This, however, is not an essential feature for the guide length may have two sets of slots, those of one set being in one phase and those of the other being in the opposite phase, successive slots along the guide belonging to the different sets and operating in phase opposition. Such a guide with two sets of slots may be termed a phase and anti-phase slot aerial.

In a preferred radio speed and drift indicating aircraft installation in accordance with the invention there are provided two slotted aerials in accordance with the said invention for transmission, one being arranged to transmit at will forward and downward to starboard or aft and downward to starboard (in dependence upon which end is energized) and the other being arranged to transmit at will forward and downward to port or aft and downward to port (again in dependence upon which end is fed) and switch means are provided for cyclically and simultaneously changing over the ends of the aerials which are fed so that when one is transmitting forward to port the other is transmitting aft to starboard while when said one is transmitting aft to port, said other is transmitting forward to starboard.

Preferably one of these aerials has one set of slots and the other has two, i.e. is a phase and anti-phase aerial. Preferably also reception is effected by a third aerial, which is also in accordance with this invention and is an aerial with a single set of slots the slots in which are more widely spaced than in the other two aerials so that it is capable of receiving from port and starboard forward and port and starboard aft i.e. is capable of receiving ground reflected energies resulting from any of the four directions of transmission. Preferably also the third aerial has a feeder which can be connected to either end thereof and means are provided for changing over the feeder connection to one end or the other simultaneously with the changing over of the connections of the two transmitting aerials. This particular arrangement, though not essential (a mere duplication of the transmitting aerial installation could be used for the reception or, if a single aerial as described be used for reception, its end need not be switched) is preferred for it not merely involves only three aerials for the whole installation but the particular arrangement of one two-slot-set switched transmitting aerial, one one-slot-set switched transmitting aerial, and one one-slot-set switched receiving aerial gives a high degree of immunity from undesired shifts of frequency selectively resulting from temperature expansion in the aerials, the overall effects of such temperature expansion in the different aerials tending to cancel out in the final result.

The invention is illustrated in and explained in connection with the accompanying drawings in which:

Fig. 1 shows in plan view a rectangular slotted waveguide of known form;

Fig. 2 shows in elevation the known waveguide of Fig. 1;

Fig. 3 is a simplified schematic plan of one form of slotted waveguide which can be used in carrying out this invention;

Fig. 4 shows one embodiment of the invention incorporating the waveguide of Fig. 3 which waveguide appears in elevation in Fig. 4;

Fig. 5 shows in simplified form a switch for use with the embodiment of Fig. 4;

Fig. 6 is a simplified schematic plan of another form of slotted waveguide which can be used in carrying out this invention;

Fig. 7 is an elevation view of another embodiment of the invention incorporating a slotted waveguide as illustrated in Fig. 6 and shown in elevation in Fig. 7;

Figures 8 and 9 show further slotted waveguides which can be used in carrying out this invention;

Fig. 10 shows in simplified schematic plan an installation in accordance with the invention and employing three slotted waveguides;

Fig. 11 shows in simplified manner a switching device for use with the installation of Fig. 10.

Referring to Figs. 1 and 2, these show a rectangular slotted waveguide radiator 1 of known form in plan and elevation respectively. Slots 2 of folded surface length equal to $$\frac{\lambda}{2}$$

(where $\lambda$ is the wavelength of the electromagnetic energy for which the guide is designed), are cut in one of the two narrow faces of the guide, the depth of cut decreasing progressively along the guide from end 3 to end 4 as the angle of cut, defined with reference to the plane of the transverse cross-section TC of the guide and hereinafter referred to as the cut angle, increases. The decrease in depth of cut is apparent from the elevation view, and the increase in cut angle is apparent from the plan view. For a typical guide the cut angle increases from 3°–14°.

The electromagnetic energy is fed into end 3 of the guide, which is terminated at end 4 by a non-reflecting load resistance purely diagrammatically indicated at 5. The energy emerges through the slots the bulk of it in the direction indicated by the arrow in Fig. 2 which is at an angle A to the plane of the transverse cross-section TC of the guide. Each slot radiates a fraction of the power available at its position in the guide. This fraction depends upon the cut angle. Since it is desirable to radiate the same amount of power from each slot and since the power available at the point at which any slot is cut is dependent upon the amount of power dissipated by the earlier slots the cut angle must be increased the further the slot is away from the end of the guide into which the energy is fed. Very precise determination of cut angles is therefore required.

Fig. 3 shows in highly simplified schematic manner one form of slotted waveguide which can be used for carrying out the invention and wherein two directions are obtainable from a single radiator. This radiator is indicated at 6 and is a rectangularly sectioned guide with slots 7 all parallel to one another and cut at a constant cut angle, for example, 9°, to the plane of the transverse cross-section. They are of the same folded length, that is to say $$\frac{\lambda}{2}$$

and are all cut to the same depth.

Fig. 4 shows an embodiment using a radiator as shown in Fig. 3, the said radiator appearing in elevation in Fig. 4. As will be seen the guide can be fed at either end from a transmitter 8 depending on the position of a waveguide switch, purely diagrammatically indicated at 9 and which is arranged to insert a terminating resistance 10 or 10' at whichever end of the radiator which is opposite the end being fed. A suitable form of switch 9 will be described later. The two selectable directions of radiation and reception are indicated by arrows. In practice the radiator is in a reflecting hood (not shown).

Fig. 5 shows a suitable switch for use at 9.

Referring to Fig. 5 the guide from the transmitter 8 leads through a known form of knuckle joint KJ to a swinging waveguide arm 11 to which are attached at equal distance either side closed waveguide members 12 and 13 each having a terminating load resistance 10 and 10' therein. The arm is swung by a driving wheel 14, e.g. through a pin and slot arrangement as illustrated. The outer faces of the members 15 and 16 which attach the members 12 and 13 to the arm, and the outer faces of shielding members 17 and 18 together with the ends of guides 11, 12 and 13 all lie substantially on an arc, the center of which is the axis of the swinging arm or guide 11.

The fixed part of the switch includes two waveguide mouths 19 and 20 spaced apart by the same angular spacing as exists between arm 11 and either of the members 12 or 13. The guide mouths are attached to one another by one of three screening members 21 which, with the guide mouths, lie on an arc parallel and close to the above mentioned arc. The guide mouths 19 and 20 lead to the respective opposite ends of the radiator (not shown in Fig. 5). With the switch in the position shown one end of the radiator is fed and the other resistance terminated by resistance 10. By moving the arm 11 so that it is opposite mouth 20, the radiator will be fed at the other end and terminated at the previously fed end by resistance 10'.

Figs. 6 and 7 are views corresponding to those of Figs. 3 and 4 respectively but employing a different form of waveguide radiator, the difference being that in Figs. 6 and 7 the slots are not parallel but change in angularity symmetrically and outwardly of the center slot. This form of radiator is not as simple to make as the form in Figs. 3 and 4, but it has rather better concentration of radiation in the chosen directions. For example the center slot may be at a cut angle of 14° whilst those on either side are cut at progressively lower cut angles up to the end slots which may have a cut angle of 3°.

Once again equal but reversed radiation patterns are produced when the guide is fed from opposite ends in accordance with this invention and by the means indicated in Fig. 7.

Figure 8 shows in plan view another form of slotted waveguide which can be used for carrying out the invention and which could be used in place of the guides shown in the embodiments of Figs. 4 and 7. Here there are two sets of slots in the guide length, marked respectively 7a and 7b. Those of set 7a are in one phase and those of the other set 7b being in the opposite phase. It will be observed that successive slots along the guide belong to the different sets and operate in phase opposition. It will be observed further that slots belonging to the same set are cut at a constant angle relative to the plane of the transverse cross section TC of the guide.

Figure 9 shows in plan view another form of slotted waveguide which can be used for carrying out the invention in embodiments as shown, for example, in Figs. 4 and 7. As was the case with the guide illustrated in Fig. 8 there are two sets of slots in the guide length marked respectively 7a and 7b likewise those of set 7a are in one phase and those of the other set 7b are in the opposite phase. However, whilst successive slots along the guide belong to the different sets and operate in phase opposition, successive slots of each set are not cut at a constant angle relative to the plane of the transverse cross section TC of the guide, but vary in angularity as do those illustrated in Fig. 6, that is to say the slots of each set change in angularity symmetrically and outwardly of the center slot of each set. Thus the center slot of each set is cut at the greatest value of cut angle of the set to which it is appropriate—in a tpical case this is 14°—and the end slots of each set are cut at the least value of cut angle of the set to which they are appropriate—in a typical case this is 3°.

Fig. 10 shows in highly simplified schematic manner the plan view of an embodiment using three slotted waveguide radiators. Two radiators 22 and 23 are adapted for transmission, one, say 22, being arranged selectively to transmit forward and downward to starboard or aft and downward to starboard (depending upon which end is energized) and the other, 23, being arranged selectively to transmit forward and downward to port or aft and downward to port (again depending upon which end is fed). It will be observed that radiator 22 has two sets of slots in phase opposition relationship one to the other and that radiator 23 has one set of slots. It will be observed further that each set of slots is cut at a constant cut angle. If desired, the slots of radiator 22 could be cut in the same way as those illustrated in Fig. 9 and the slots of radiator 23 could be cut in the same way as those illustrated in Fig. 3. Switches 24 and 25 are provided for cyclically and simuletaneously changing over the ends of the radiators 22 and 23 so that when one, say 22, is transmitting forward to port the other, 23 is transmitting aft to starboard while said one, 22, is transmitting aft to port the other, 23 is transmitting forward to starboard. The switches 24 and 25 are fed from a transmitter 26.

Reception is effected by the third radiator 27. This radiator is a simple slot set radiator with the slots more widely spaced than in radiators 22 and 23 so that it is capable of receiving from downwardly to port or starboard forward or aft, i.e. is capable of receiving ground reflected energies resulting from any of the four directions of transmisison. The feeder connected end of this third radiator 27 is changed over from one end to the other simultaneously with the changing over of the connections of the two transmitting radiators 22 or 23. This switching is effected by means of the switch schematically represented at 28 and which feeds the received energies to receiver 29. The switches 24, 25 and 28 are ganged together, the connections effected by the switches in one of the two possible positions being indicated by the arrows in each switch.

Fig. 11 shows in highly simplified manner a suitable construction for the three switches schematically represented at 24, 25 and 28 in Fig. 10. Each switch unit has an inner rotary member (30, 31 or 32 respectively) with a diametrical bore having a terminating resistance (33, 34 or 35 respectively) towards one end of said bore, said terminating resistance being housed in a walled off outward facing portion of the bore. In addition each switch unit has an outer stationary member (36, 37 or 38 respectively) with three waveguide mouths, two of which are of the same cross sectional area as said bore, lie on the same level as said bore, and at opposite ends of a diameter and close to and facing the periphery of said rotary member. The two said waveguide mouths are connected one to each end of the appropriate radiator as shown in Fig. 10. The third mouth of each switch unit is arranged to be lower than the level of the diametrical bore and to be connected with it at its mid-point by means of a rotating right-angled joint J.

In the case of the switch units 24 and 25 the third mouth of each is connected to the transmitter 26 of Fig. 10 via waveguide 39 and in the case of switching unit 28 to the receiver 29 of Fig. 10 via waveguide 40. By means of the above mentioned ganging the switch units rotate together, each switch unit having two positions in one of which it connects a feeder mouth to one end of a radiator and a terminating resistance to the other and in the other of which the radiator ends connected to the feeder mouth and the terminating resistance (respectively) are interchanged.

We claim:

1. An aerial system comprising in combination a wave guide having slots therein arranged so that the change of angle of the slots with reference to the transverse cross-sectional plane of the waveguide from slot to slot is in the same direction from either end of the waveguide to a central slot and the amount of said change from one slot to a successive slot is symmetrical about the said central slot, a feeder for said waveguide, a waveguide switch for selectively connecting at will either end of said waveguide to the feeder, two non-reflecting load resistances, and switching means for connecting one of the load resistances to whichever end of the radiator is not connected to the feeder.

2. An aerial system as set forth in claim 1 wherein the waveguide has two sets of slots within the longitudinal dimension thereof, those of one set being in one phase and those of the other being in the opposite phase, the successive slots along the guide belonging to the different sets and operating in phase opposition.

3. A radio speed and drift indication aircraft installation comprising two slotted aerial systems as set forth in claim 1, one being arranged to selectively transmit at will forward and downward to starboard, or aft and downward to starboard in dependence upon which end is energized, and the other being arranged to transmit at will forward and downward to port, or aft and downward to port again in dependence upon which end is fed, and switch means for cyclically and simultaneously changing over the ends of the aerials which are fed so that when one is transmitting forward to port the other is transmitting aft to starboard while when said one is transmitting aft to port, said other is transmitting forward to starboard.

4. An aerial system as set forth in claim 1 comprising a second slotted waveguide connected to said switch and said switching means, one of the waveguides having one set of slots and the other having two sets of slots, said switch and said switching means being connected to said waveguides and said feeder for selectively connecting one end of each of the waveguides to said feeder and for connecting the other end of each of the waveguides to one of the non-reflecting load resistances.

5. An aerial system according to claim 4 further including a receiver and a third waveguide connected to said receiver and having a single set of slots therein, said last-mentioned set of slots being more widely spaced than the slots in said first and said second waveguides and wherein said third waveguide is positioned to receive ground reflected waves from said first and said second waveguides from any of four mutually perpendicular directions.

6. An aerial system according to claim 5 further including a feeder and second switching means including a non-reflecting load resistance and connected between said receiver and said third waveguide for selectively connecting one end of said third waveguide to said receiver and connecting the other end of said third waveguide to said last-mentioned non-reflecting load resistance, said second switching means being mechanically coupled to said first-mentioned switching means and said switch for simultaneous actuation therewith.

References Cited in the file of this patent
UNITED STATES PATENTS

| | | |
|---|---|---|
| 2,605,413 | Alvarez | July 29, 1952 |
| 2,730,717 | Katchky et al. | Jan. 10, 1956 |